United States Patent [19]

Stephenson, III

[11] Patent Number: 5,675,400
[45] Date of Patent: Oct. 7, 1997

[54] METHOD OF REPRODUCING A PORTION OF A PHOTOGRAPH

[75] Inventor: Stanley Ward Stephenson, III, Spencerport, N.Y.

[73] Assignee: Eastman Kodak Company, Rochester, N.Y.

[21] Appl. No.: 575,747

[22] Filed: Dec. 20, 1995

[51] Int. Cl.⁶ .................. G03B 27/52; H04N 1/032
[52] U.S. Cl. .................................... 355/40; 358/453
[58] Field of Search .................. 355/40, 41, 74, 355/125; 358/302, 450, 453

[56] References Cited

U.S. PATENT DOCUMENTS

| | | |
|---|---|---|
| 3,490,844 | 1/1970 | Sapp, Jr. . |
| 4,482,924 | 11/1984 | Brownstein . |
| 4,494,862 | 1/1985 | Tanaka . |
| 4,655,577 | 4/1987 | Ikuta . |
| 4,704,796 | 11/1987 | Gauer .................. 355/40 |
| 4,734,789 | 3/1988 | Smith et al. . |
| 5,018,023 | 5/1991 | Kubota .................. 358/450 |
| 5,023,655 | 6/1991 | Hicks . |
| 5,043,758 | 8/1991 | Nealon . |
| 5,072,253 | 12/1991 | Patton . |
| 5,093,684 | 3/1992 | Crochetierre et al. . |
| 5,132,715 | 7/1992 | Taillie . |
| 5,179,409 | 1/1993 | Kazami et al. . |
| 5,196,859 | 3/1993 | Tomiyama . |
| 5,264,683 | 11/1993 | Yoshikawa . |
| 5,281,993 | 1/1994 | Crochetierre et al. . |
| 5,359,387 | 10/1994 | Hicks . |

*Primary Examiner*—John H. Pendegrass
*Attorney, Agent, or Firm*—David A. Howley; Charles E. Snee, III

[57] ABSTRACT

A photograph is masked such that only a portion of a scene in the photograph is visible. The mask is adjusted to alter the portion of the scene which is visible until a portion of the scene which is desired to be reproduced is visible. Information which identifies the portion of the scene which is desired to be reproduced is recorded. The recorded information is used to create a hard copy reproduction of the portion of the scene which is desired to be reproduced.

9 Claims, 6 Drawing Sheets

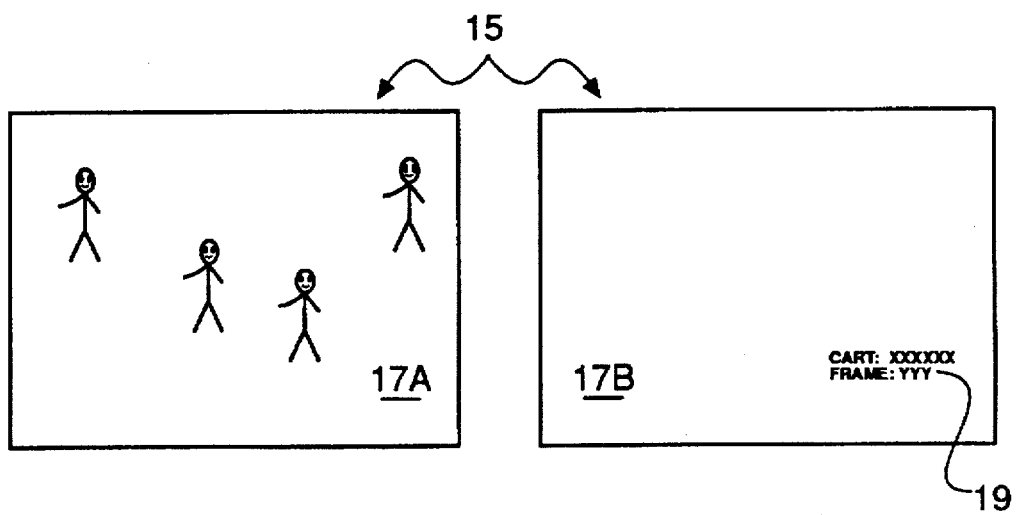
FIG. 3A  FIG. 3B
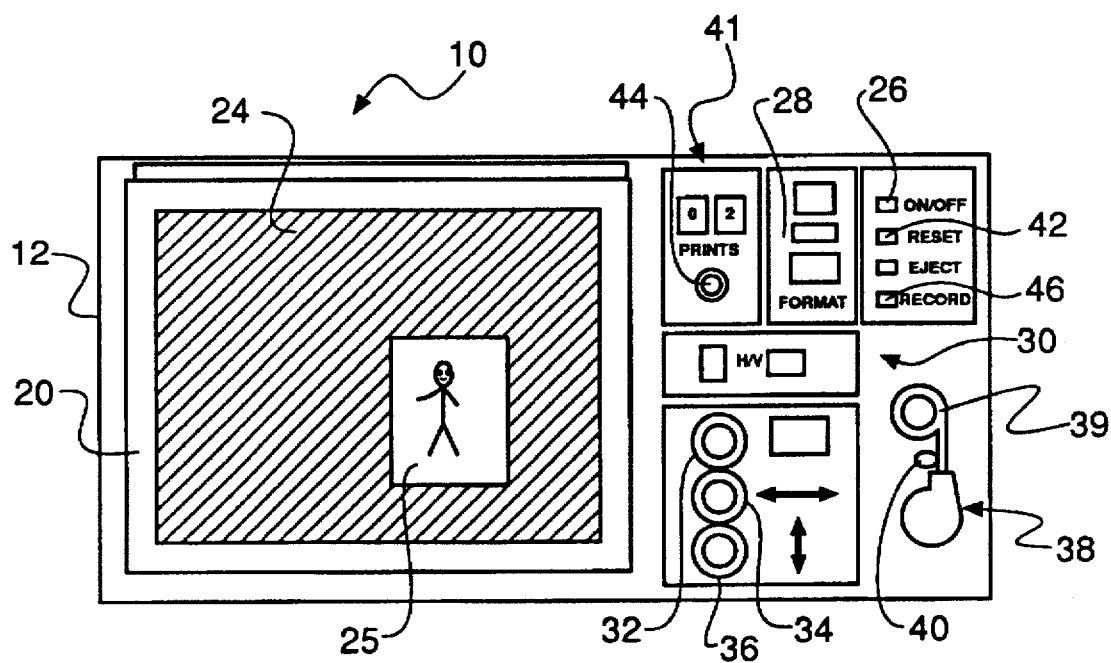
FIG. 4

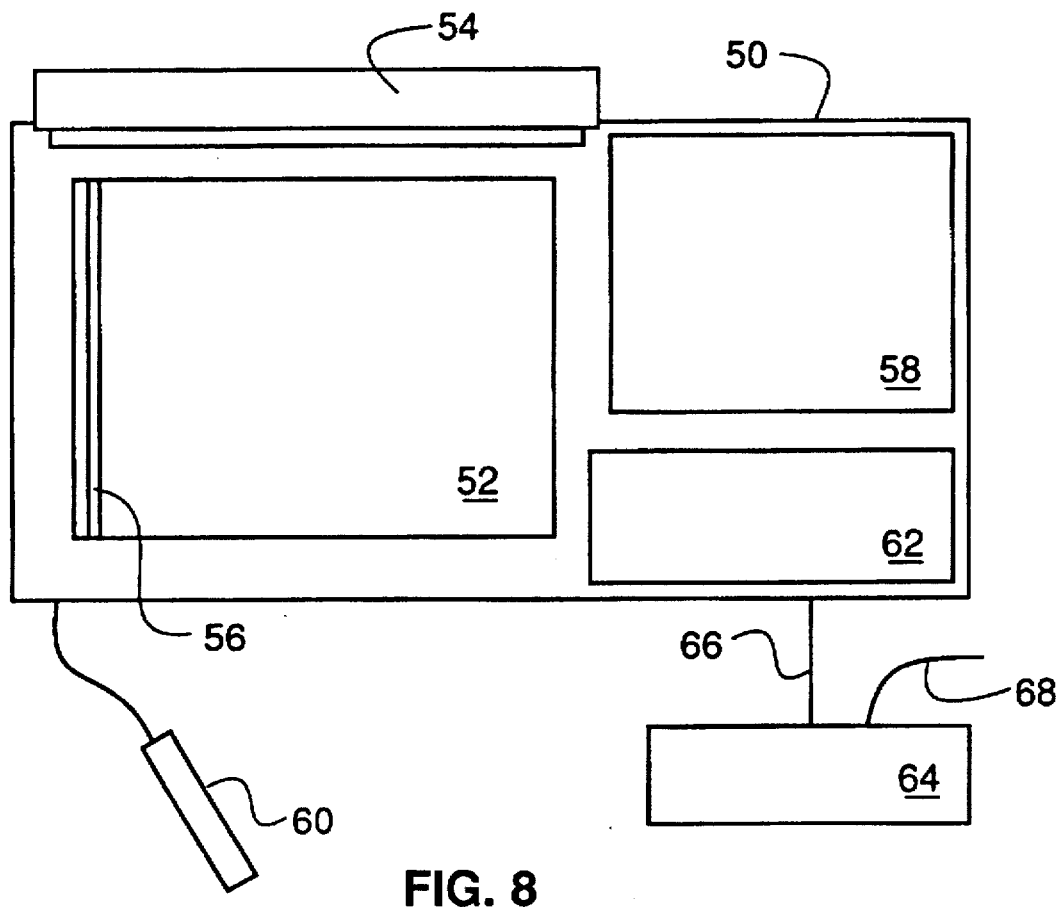
FIG. 8
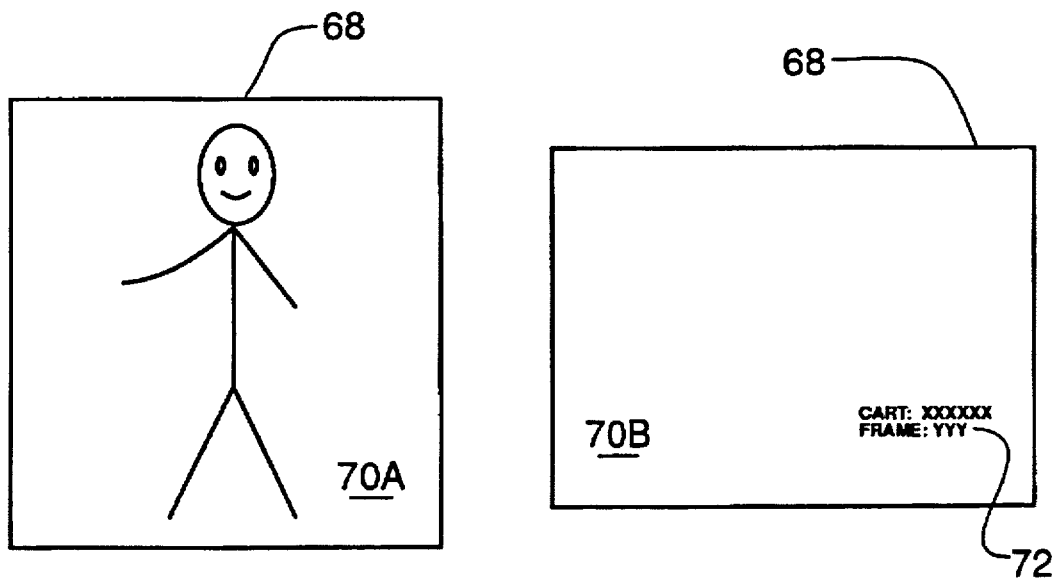
FIG. 9A  FIG. 9B

METHOD OF REPRODUCING A PORTION OF A PHOTOGRAPH

FIELD OF THE INVENTION

The invention relates generally to the field of photography, and in particular to image reproduction. More specifically, the invention relates to a method of reproducing a portion of a photograph.

BACKGROUND OF THE INVENTION

Photographic cameras are used to record images on a silver-halide type negative filmstrip. Typically, the camera operator frames a scene with a viewfinder and then presses a shutter button to record the scene on a filmstrip frame. Once all the frames have had images recorded on them, the operator has the filmstrip developed. Light is then passed through each of the developed film frames to record a positive image from the frame onto a photographic paper. The exposed photographic paper is developed and cut into pieces to form individual photographs.

On occasion, the camera operator will realize, upon viewing a photograph, that she has incorrectly framed the scene. In one such scenario, the operator has captured more of the scene than desired and has not framed the smaller subset of the scene which was actually desired to be recorded. By working with the negative frame, a selected subset of the image can be printed to create the desired image. This reformatting process can be done in a lab using conventional enlarger/printers. The negative frame is projected at various magnifications and shifted in position until the desired sub-image is properly placed for printing onto photographic paper. The paper is then exposed and the sub-image photograph is created in conventional fashion.

Re-framing can also be accomplished using a Kodak Create-a-Print™ system. In such a system, a negative filmstrip is inserted into the machine and an image on the filmstrip is projected into a video camera. An operator views the video image and manipulates it (e.g. crop, zoom) until the desired sub-image on the frame is presented. The sub-image is then optically printed onto photographic paper by exposing the paper to light projected through the film frame, which is masked if necessary, and appropriate optics.

Another Kodak product which can reproduce sub-images from a photograph or negative filmstrip is the Kodak Creation Station™. The photograph or image on the negative film is scanned electronically to obtain a digital representation of the image. The digital image can then be manipulated as desired (e.g. zoom, crop, rotate) while being viewed on a monitor and then the selected portion of the digital image is printed with a digital printer (e.g. a thermal printer). All of the systems described above require complex, large, expensive equipment (e.g. video cameras, scanners) to create a sub-image of an image in a photograph.

SUMMARY OF THE INVENTION

The present invention is directed to overcoming one or more of the problems set forth above. Briefly summarized, according to one aspect of the present invention, a photograph is masked such that only a portion of a scene in the photograph is visible. The mask is adjusted to alter the portion of the scene which is visible until a portion of the scene which is desired to be reproduced is visible. Information which identifies the portion of the scene which is desired to be reproduced is recorded. The recorded information is used to create a hard copy reproduction of the portion of the scene which is desired to be reproduced.

The present invention provides a simplified, compact, relatively inexpensive method for reproducing a portion of a photograph. These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 3A is a front view of a photograph with a scene recorded thereon;

FIG. 3B is a back view of the photograph of FIG. 3A and displays film cartridge and frame identifiers;

FIG. 4 is a top view of the machine of FIG. 1 with its cover closed and an LCD mask in operation;

FIG. 8 is a top view of a scanner for scanning a photograph and a digital printer;

FIGS. 9A and B are front and back views respectively of a reproduction of part of a photograph.

DETAILED DESCRIPTION OF THE INVENTION

Figure 1:
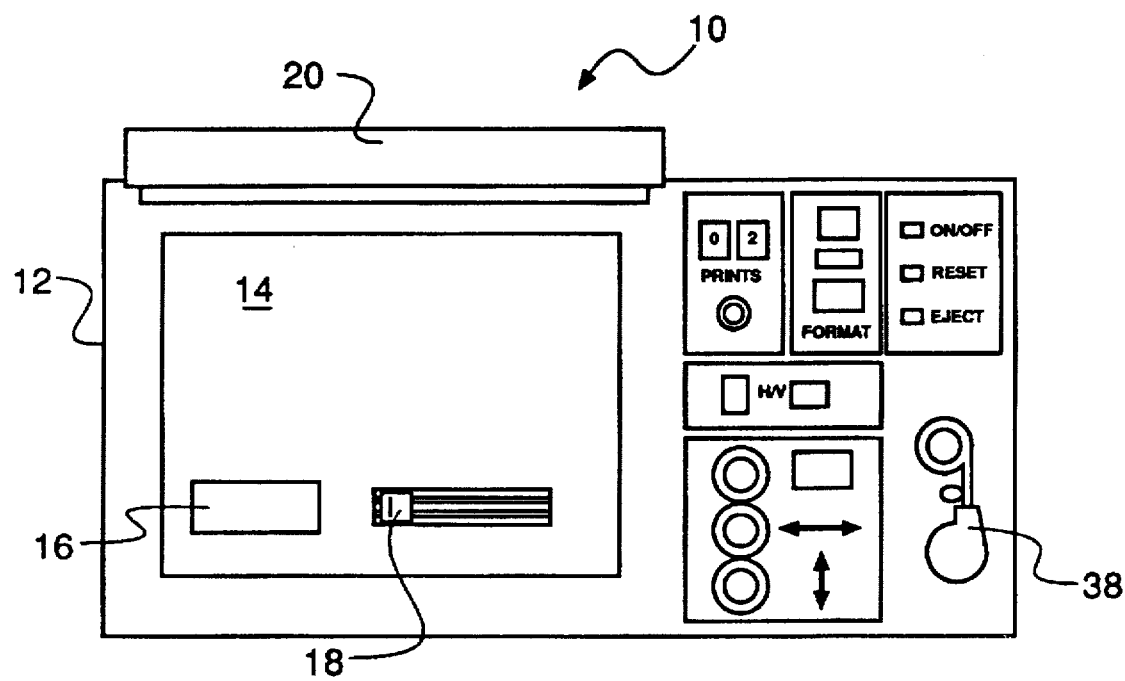
FIG. 1 is a top view of a photograph sub-image designator machine with a cover in an open position.
Figure 2:
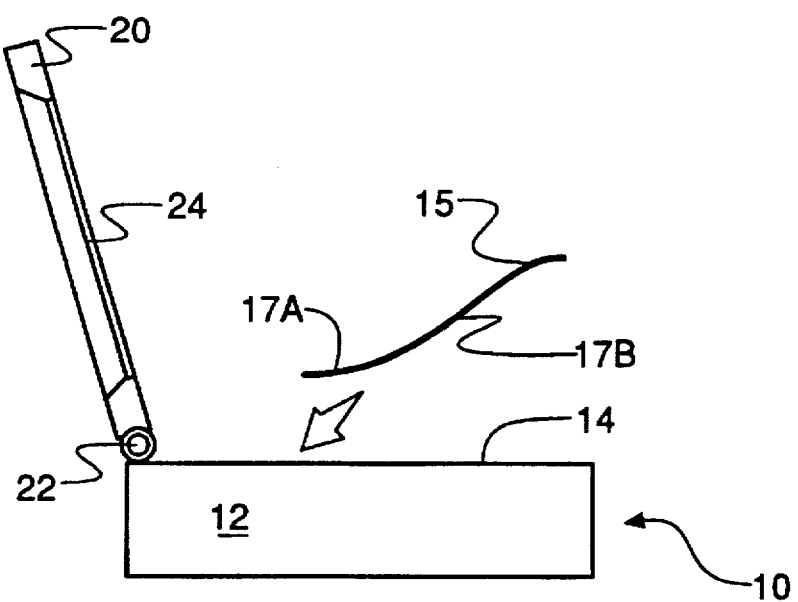
FIG. 2 is an end view of the machine of FIG. 1 as a photograph is lowered onto a platen of the machine.

Beginning with FIGS. 1–3B, a photograph sub-image designator machine, designated generally by the reference numeral 10, includes a body 12 and a platen 14. A photograph 15 is placed on the platen such that an image side 17A of the photograph faces up (away from the platen). The photograph is positioned such that the lower left corner of the photograph is abutted against the lower left corner of the platen as viewed in FIG. 1. When properly positioned on platen 14, a cartridge and frame identifier 19, located in the lower right corner of back side 17B of the photograph, is aligned over an information reader 16. Identifier 19 is preferably applied to the photograph as the photograph is being made and can be in human readable and/or, more preferably, machine readable form (e.g. bar code).

Reader 16 reads identifier 19 to correlate the photograph with a particular image frame on a photographic filmstrip located in a particular cartridge. The reader also assists in determining that the photograph has been properly positioned on platen 14 (described in further detail below). A small ink-jet printer 18 is used to print coordinate data on the back of the photograph which identifies the portion of the photograph that is to be reproduced. Once the photograph has been placed on the platen, an operator rotates a cover 20, supported for rotation by a pivot 22, from an open position (FIG. 1) to a closed position (FIG. 4) covering the photograph. Cover 20 includes an integral liquid crystal display layer 24 which is used to mask part of the image in the photograph while viewing the remainder of the image.

The operator then inserts a filmstrip cartridge 110 (see FIG. 5) into a cartridge holder 38. The cartridge is associated with photograph 15 and contains the developed negative film frame from which the photograph was created. Holder 38 need not be light tight as the filmstrip inside the cartridge has already been developed. The film cartridge is preferably one which contains a light lock door 119 movable between an open position, allowing the filmstrip to exit the cartridge through an opening 120 adjacent the door, and a closed position sealing the inside of the cartridge in a light tight manner. The filmstrip within the cartridge preferably includes a transparent magnetic layer for recording information related to the filmstrip, picture taking conditions, etc. Such a cartridge and filmstrip are well known to those skilled in the art.

Figure 5:
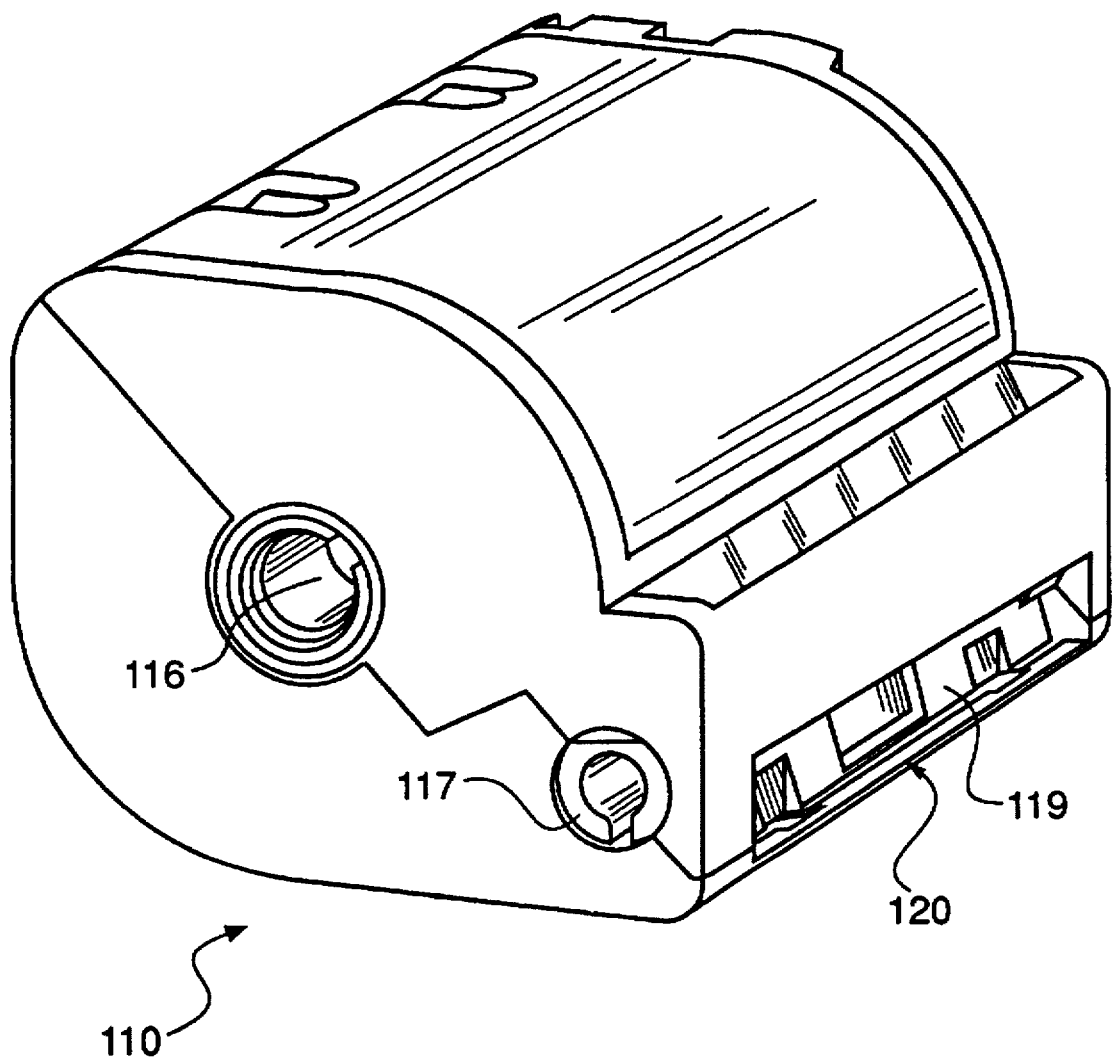
FIG. 5 is a perspective view of a photographic filmstrip cartridge.
Figure 6:
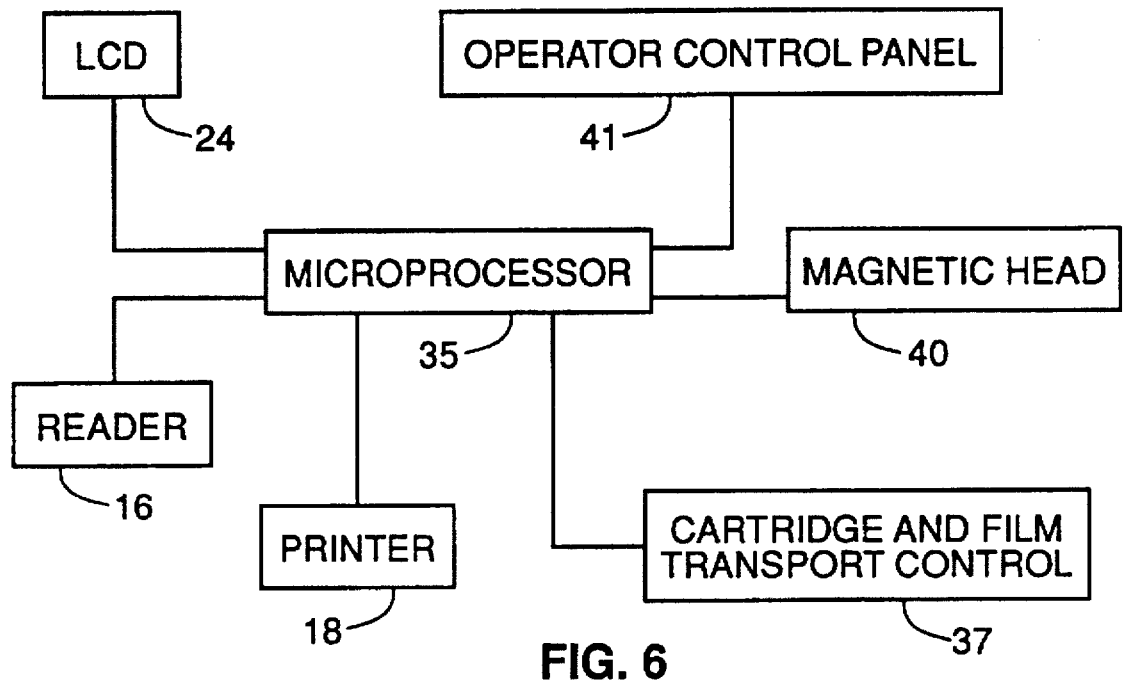
FIG. 6 is a block diagram of the components of the machine of FIG. 1.

Turning to FIGS. 4-6, once cover 20 has been closed, the operator presses an "ON/OFF" button 26 to turn machine 10 on. A microprocessor 35 controls operation of machine 10. Reader 16 then reads identifier 19 on the back of the photograph. If reader 16 cannot read identifier 19, a warning message can be provided to the operator via a speaker or second liquid crystal display (not shown), asking the operator to properly position the photograph in the lower left corner of the platen. Once the photograph is properly positioned, identifier 19 is read from the back of the photograph by the reader.

The microprocessor then activates a cartridge and film transport control 37 which includes a drive member and a spool driver(not shown) which both engaged cartridge 110 when it was inserted into holder 38. The drive member, which engages a drive lug 117 at one end of light lock door 119 on cartridge 110 (FIG. 5) is rotated to rotate the drive lug, thereby rotating door 119 from a closed position to an open position. The spool driver, which likewise engages a drive spool 116 on cartridge 110, is then rotated to rotate the spool about which the filmstrip is wound, thus causing a lead end of the filmstrip to be thrust out of opening 120 past door 119. Once the lead end of the filmstrip has exited the cartridge it may be driven further out by a pinch drive (not shown) which engages the edge of the film. The filmstrip which has exited the cartridge is temporarily stored in a take-up chamber 39.

As the filmstrip is driven out of the cartridge, it passes by a magnetic read/write head 40 which reads information from the magnetic layer on the filmstrip to identify the film cartridge. The read information is then compared with the read identifier from the back of the photograph to confirm that the correct cartridge, corresponding to the photograph, has been placed in the holder. If the cartridge does not correspond to the photograph, a message to that effect is provided to the operator so that corrective action can be taken. Once the cartridge has been identified as relating to the photograph, the microprocessor proceeds to the next step.

A default mask is provided in a central location on LCD 24 by darkening a major portion of the LCD and leaving a clear window open through which a portion of the photograph can be used. The operator then utilizes an operator control panel 41 to manipulate the clear window. If desired, the operator can press any of three "FORMAT" buttons 28 to vary the aspect ratio of the transparent window presented in LCD 24. A pair of "H/V" buttons 30 can be pressed to rotate the transparent window in the LCD between a horizontal and a vertical orientation. A first knob 32 can be rotated in one direction to increase the size of the transparent window and in another direction to decrease the window's size. A second knob 34 is rotated in one direction to move the transparent window left and in another direction to move the window right. A third knob 36 is rotated in one direction to move the transparent window up and in another direction to move the window down.

The operator utilizes the control panel to move and shape the transparent window presented in LCD 24 until that portion of the photograph which is desired to be reproduced is viewable through a window 25 in LCD 24. If the operator has made a mistake, (s)he can press a reset button 42 to return to the original default window. When the window is properly positioned, the operator rotates a dial 44 to set the number of prints desired to be made of the portion of the photograph viewable through window 25.

Figure 7:
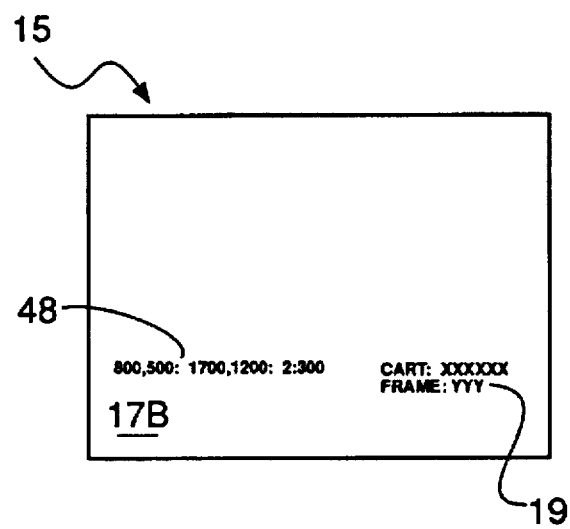
FIG. 7 is a back view of the photograph of FIG. 3B with location information added.

Now the operator presses a record button 46 to cause information to be record on the back of the photograph and/or the magnetic layer on the filmstrip. Such information identifies that portion of the photograph to be reproduced and the number of reproductions to be made. As shown in FIG. 7, information 48 has been recorded on back side 17B of photograph 15 by printer 18. In this example, photograph 15 is a 4R print which is 4 inches by 6 inches. LCD 24 is a 300 dot per inch (DPI) LCD. Information 48 includes the pixel location of the lower left (800,500) and upper right (1700,1200) corners of window 25 in LCD 24. The first number for each corner represents the horizontal distance of the corner from the left side of LCD 24 while the second number for each corner represents the vertical distance of the corner from the lower side of LCD 24. The number of reproductions of the identified portion of photograph 15 is included in information 48 (in this case 2 reproductions) as well as the resolution of LCD 24 (300DPI). This information is also recorded on the magnetic layer of the filmstrip as the filmstrip is driven back into its cartridge. The information recorded on the filmstrip also includes the frame number from which the photograph was made.

Turning now to FIG. 8, apparatus for reproducing the designated portion of the photograph will be described. A flat-bed scanner 50 includes a platen 52, microprocessor (not shown) and a cover 54 rotatable to a position covering the platen. A linear scanning element 56, which includes an illumination source and a multiplicity of charged-coupled devices, is home-positioned at the left end of the platen. An operator is instructed by the microprocessor via an LCD display 58 to place photograph 15 (FIG. 3A) on platen 52 with image side 17A facing the platen. The photograph is positioned such that the lower left corner of the back side 17B of the photograph is aligned with the lower left corner of the platen. Sensors (not shown) in the lower left corner of platen 52 inform the microprocessor that the picture has been properly positioned.

The operator is now instructed by the LCD to enter information 48 from the back of the photograph into the scanner. If information 48 is in machine-readable form, such as a bar-code, the operator uses a bar code reader 60 to swipe the bar-code on the back of photograph 15 to obtain information 48. Alternatively, the operator can read information 48 and enter this information manually into scanner 50 via a keyboard 62. The operator is then instructed to close cover 54. When the microprocessor senses that the cover has been closed, it causes scanning element 56 to commence scanning the image in photograph 15. Preferably, microprocessor utilizes information 48 to scan only that portion of the image in the photograph that has been designated for reproduction. As such, scanning can be accomplished much more quickly than if the entire image had to be scanned. Further, because less image information is scanned into memory, image processing time is greatly reduced.

After scanning has been completed, the microprocessor in scanner 50 image processes the scanned in data and outputs the image processed data to a digital printer (e.g. thermal or ink-jet printer) 64 via a data connection 66. The digital printer uses the image processed data to create the number of hard copy reproductions 68 requested of that portion of photograph 15 which was designated for printing.

FIGS. 9A and B display hardcopy reproduction 68. A front side 70A of the reproduction includes that portion of the image in photograph 15 designated for reproduction (see FIG. 4). A small ink-jet printer (not shown) in digital printer 64 back-prints on side 70B of reproduction 68 cartridge and frame identifier information 72 similar to cartridge and frame identifier information 19 on the back of photograph 15. Information 72, which can be in human and/or machine-readable form, can be utilized if further sub-images of reproduction 68 are desired.

Figure 10:
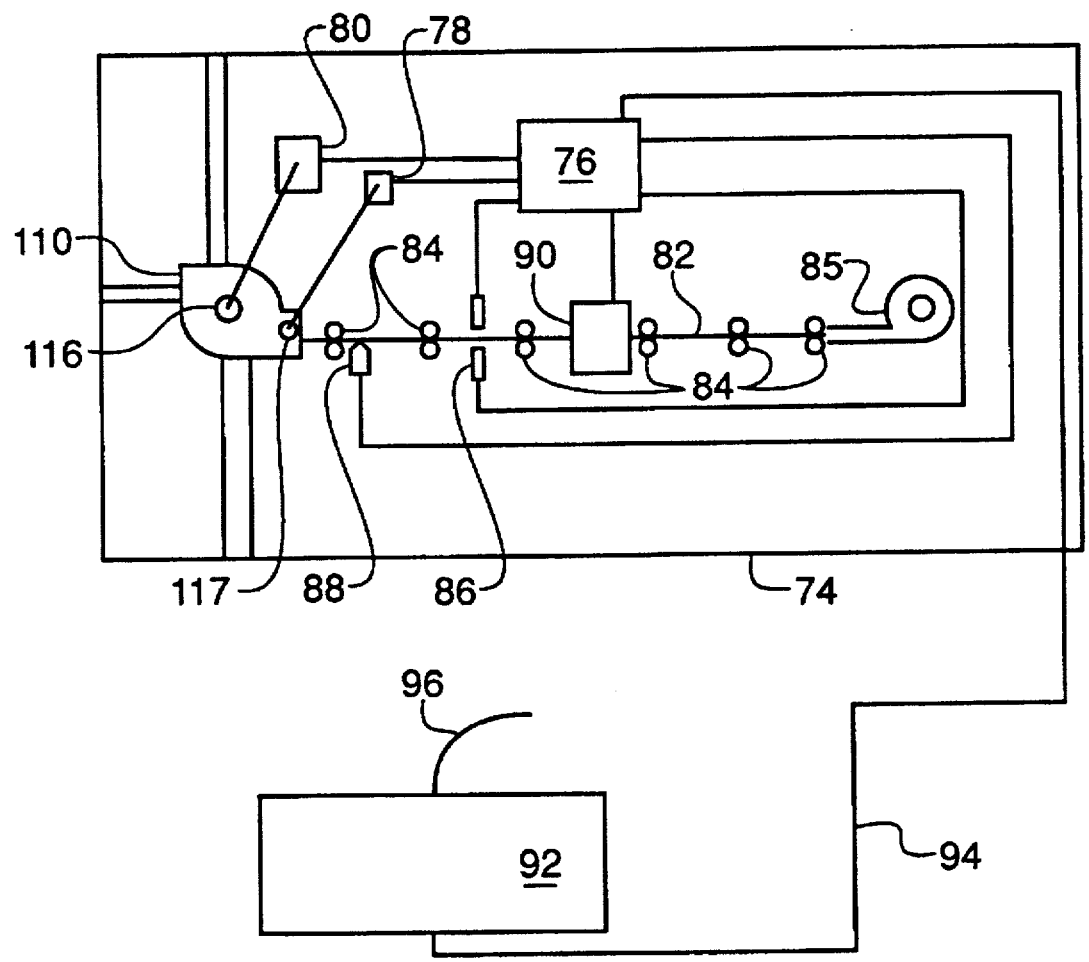
FIG. 10 is a side view of a film scanner and digital printer.

FIG. 10 discloses apparatus for making a hard copy reproduction of the designated portion of photograph 15 using the filmstrip in cartridge 110. A film scanner 74 supports cartridge 110 within the scanner. A microprocessor 76 controls operation of the scanner. After cartridge 110 has been secured within scanner 74, microprocessor 76 instructs a solenoid 78 to open light-lock door 119 (FIG. 5) via drive lug 117. The microprocessor then instructs a film drive 80 to rotate spool 116 in order to drive a photographic filmstrip 82 from cartridge 110. The filmstrip is driven further out of the cartridge by a series of pinch rollers 84 and is temporarily stored in a storage patrone 85. A film position sensor 86, which includes a radiation emitter and detector, senses the passage of perforations in the filmstrip. Microprocessor 76 utilizes the filmstrip position data in driving pinch rollers 84 for properly positioning the filmstrip in the scanner (the motor(s) and connections between the microprocessor and pinch rollers 84 are omitted to simplify the drawing).

A magnetic head 88 reads information from the magnetic layer on the filmstrip which indicates a frame number and which portion of the frame to reproduce as well as the number of reproductions to make. This information is passed to microprocessor 76. Once the microprocessor has this information, it causes the filmstrip to be moved to position the designated frame at a start gate in a film scanner 90. Microprocessor then causes scanner 90 to commence scanning the designated frame to obtain an electronic representation of the image in the frame. Again, preferably only a designated portion of the film frame, corresponding to that portion of photograph 15 that was designated for reproduction, is scanned, thus reducing image acquisition and processing time.

After the film frame has been scanned, the scanned data is image processed and passed to a digital printer 92 via a data link 94. Digital printer 94 (e.g. a thermal or ink jet printer) uses the image processed data to create the number of hard copy reproductions 96 requested of that portion of photograph 15 designated for reproduction (similar to reproduction 68 in FIG. 9). Printer 92 also includes a small ink jet printer (not shown) for back printing on reproduction 96 cartridge and frame identification information.

The invention has been described with reference to a preferred embodiment. However, it will be appreciated that variations and modifications can be effected by a person of ordinary skill in the art without departing from the scope of the invention.

I claim:

1. A method of making a reproduction of a portion of a hard copy image, comprising the steps of:

manually isolating a portion of the image to be reproduced by making only that portion visible;

automatically identifying the location of the portion within the image;

scanning substantially only the selected portion of the image to obtain an electronic representation of the portion of the image; and utilizing the electronic representation of the portion of the image to reproduce only that portion of the image in a hard copy.

2. The method of claim 1, further comprising the steps of:

recording on the image information related to the location of said portion in the image;

reading said recorded information, said read information being used in said scanning step to scan substantially only said portion of the image to obtain an electronic representation of the portion of the image.

3. A method of making a reproduction of a portion of a photograph, comprising the steps of:

reading first indicia on a photograph and second indicia on a filmstrip related to the first indicia, the first and second indicia identifying the filmstrip and an image frame on the filmstrip from which the photograph was made;

verifying that the photograph corresponds to the filmstrip by comparing the first and second indicia;

selecting a portion of the photograph to reproduce;

identifying the location of said portion of the photograph to be reproduced;

recording information identifying the location of said portion of the photograph on the filmstrip; and utilizing the recorded information to reproduce said portion of the photograph from the image frame on the filmstrip from which the photograph was made.

4. A method of reproducing a selected portion of a scene in a photograph, comprising the steps of:

masking the photograph with a mask such that only the selected portion of the scene in the photograph is visible;

adjusting the mask to alter the portion of the scene which is visible until only the selected portion of the scene which is desired to be reproduced is visible;

automatically recording information which identifies the selected portion of the scene which is desired to be reproduced; and using the recorded information to create a hard copy reproduction of the selected portion of the scene which is desired to be reproduced.

5. The method of claim 4, wherein the masking step utilizes a liquid crystal display to mask the photograph.

6. The method of claim 4, wherein the recording step records said information on a photographic filmstrip which has recorded thereon an image from which said photograph was made.

7. The method of claim 6, wherein the recording step records said information on a transparent magnetic layer on the photographic filmstrip.

8. The method of claim 4, further comprising the step of:

providing indicia on the back of the photograph for identifying the photograph as corresponding to a particular image recorded on a photographic filmstrip.

9. The method of claim 4, wherein the recording step records said information on the photograph.

* * * * *